United States Patent [19]

Yanagawa et al.

[11] 4,316,529
[45] Feb. 23, 1982

[54] BRAKE BOOSTER

[75] Inventors: Ichiro Yanagawa, Higashimatsuyama; Tokio Kurita; Kei Nakasu, both of Toyota, all of Japan

[73] Assignee: Toyota Jidosha Kogyo Kabushiki Kaisha, Japan

[21] Appl. No.: 146,088

[22] Filed: May 2, 1980

[30] Foreign Application Priority Data

May 23, 1979 [JP] Japan .................................. 54/63462

[51] Int. Cl.³ .................... F16D 63/00; B60T 17/22
[52] U.S. Cl. .................................. 188/1.11; 60/534; 60/593; 92/5 R
[58] Field of Search ................. 60/534, 535, 545, 593, 60/555, 556; 92/5 R, 85 A, 85 B; 188/1 A

[56] References Cited

U.S. PATENT DOCUMENTS

| | | | |
|---|---|---|---|
| 2,793,623 | 5/1957 | Ludwig | 92/85 B |
| 2,831,933 | 4/1958 | Schrameck | 92/85 A |
| 2,918,908 | 12/1959 | Herner | 92/85 B |
| 2,976,686 | 3/1961 | Stelzer | 60/555 |
| 4,084,671 | 4/1978 | Ternehall | 92/5 R |
| 4,109,467 | 8/1978 | Lukas | 60/534 |

*Primary Examiner*—Abraham Hershkovitz
*Attorney, Agent, or Firm*—McGlew and Tuttle

[57] ABSTRACT

A brake booster consisting of a power cylinder and a hydraulic cylinder in combination and a wear detector for detecting a predetermined extent of wear of a brake lining is disclosed, which comprises the wear detector being formed of a switch operating member provided with a spring at one end and adapted to be moved by the action of a power piston in the power cylinder, a switch to be actuated due to the movement of the switch operating member and means apparatus for exerting a pressure corresponding to the operating pressure of the power piston on the other end of the switch operating member so that the switch operating member can be moved by the action of the power piston through the spring.

4 Claims, 6 Drawing Figures

STROKE OF THE POWER PISTON

OPERATING PRESSURE OF THE POWER PISTON

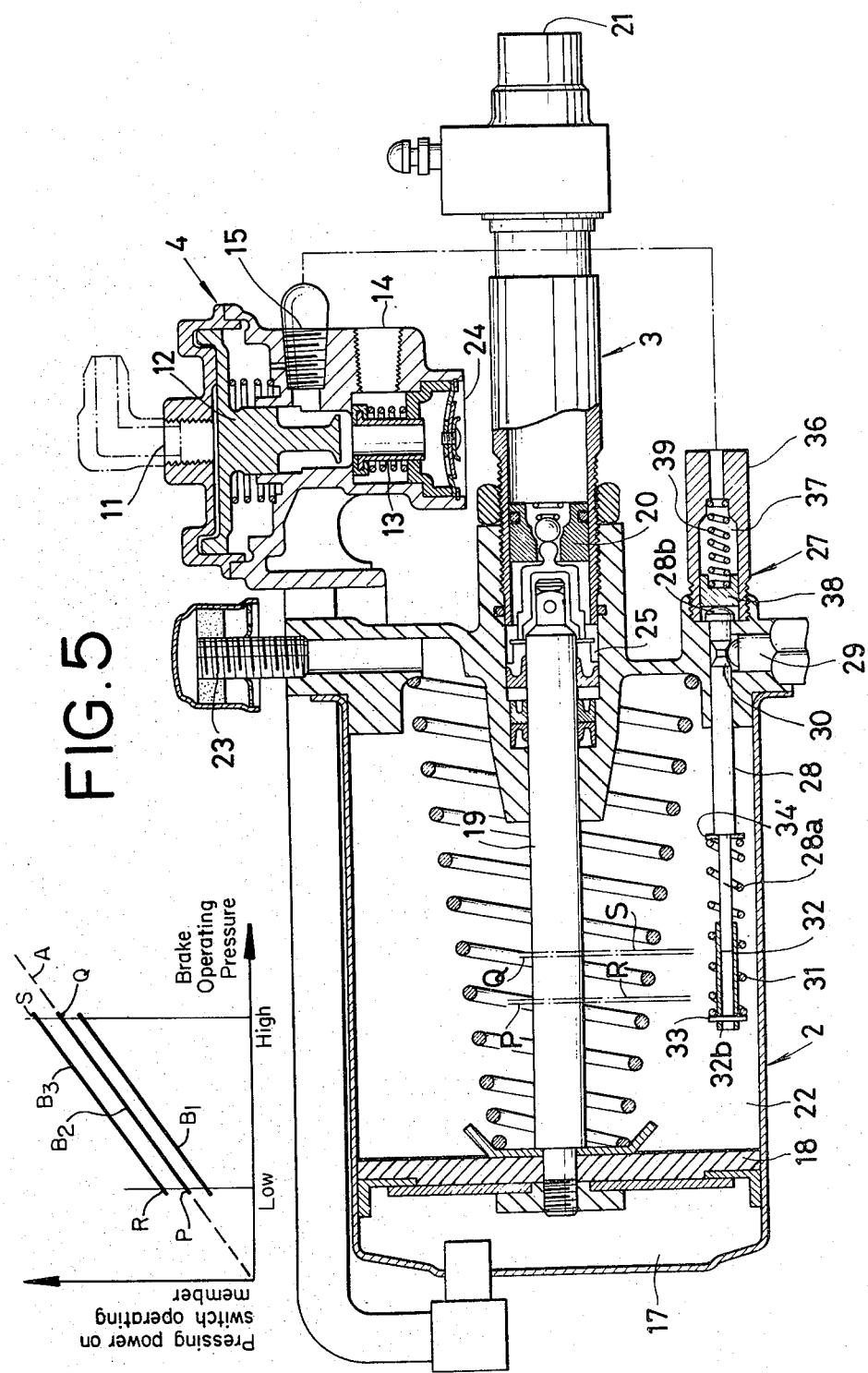

BRAKE BOOSTER

BACKGROUND OF THE INVENTION

1. Field of the Invention

The present invention relates to improvements in a brake booster for use in, for example, an automobile, and, more particularly, to a vacuum brake booster or pneumatic brake booster comprising a power cylinder combined with a hydraulic cylinder and a wear detector to be operated by a stroke of a power piston associated with the power cylinder for detecting the wear of a brake lining.

2. Description of the Prior Art

FIGS. 1 and 2 show an example of the conventional brake system for use in a four-wheel vehicle which includes a pair of brake boosters 1 and 1', each of an air over hydraulic type. Since the brake boosters 1 and 1' are the same in construction and operation, the booster 1 only for front wheels 8 will be described. The other brake booster 1' is applied to the rear wheels 9 and connected with the front wheel brake booster 1 in parallel.

In FIG. 1, the brake booster 1 is constituted of a power cylinder 2 combined with a hydraulic cylinder 3. The power cylinder 2 is communicated with an air reservoir 5 through a relay valve 4.

The relay valve 4 is controlled in response to an operation of a braking valve 6 so that when the latter is opened and closed the former 4 will be opened and closed correspondingly. Compressed air is supplied to the air reservoir 5 by means of an air compressor 7 and reserved in the reservoir. When an operator of the vehicle provided with the brake boosters 1 and 1' steps on a brake pedal 6a, a pressure indication is transmitted from the reservoir 5 to the relay valve 4, causing the latter to be opened. With the relay valve 4 being opened, compressed air is supplied from the air reservoir 5 to the power cylinder 2 for its operation. Consequently, the hydraulic cylinder 3 is operated to deliver a braking fluid, under pressure, to the front wheels 8.

FIG. 2 is a cross-section of the brake booster 1 and will be described in more detail with reference to the drawing. A pressure indication caused by the stepping-in of the pedal 6a, is supplied to a pressure indication port 11 of the relay valve 4. This causes a relay piston 12 to be lowered and to press a valve disc 13 down. With the valve disc 13 being pressed down, a supply port 14 which is in communication with the air reservoir 5, comes in communication with an outlet port 15 which is in communication with the power cylinder 2 so that compressed air from the air reservoir 5 is permitted to pass through the supply port 14, the outlet port 15 and a passage 16 to a pressure chamber 17 of the power cylinder 2. Thus, the power piston 18 of the power cylinder 2 is moved in the direction shown by the arrow $T_1$. A rod 19 of the piston 18 is connected to a hydraulic piston 20 of the hydraulic cylinder 3. With the movement of the power piston 18, the hydraulic piston 20 is also moved in the direction shown by the arrow $T_2$, so that brake fluid is supplied from a fluid pressure discharge port 21 of the hydraulic cylinder to the front wheels 8. An atmospheric chamber 22 of the power cylinder 2 is in communication with the atmosphere through a port 23. The relay valve 4 is formed with an exhaust port 24 to exhaust compressed air from the pressure chamber 17 when the braking force is to be removed. Reference numeral 25 shows an oil chamber which is connected to an oil reservoir 26 in FIG. 1.

The booster 1 is further provided with a wear detector 27 for detecting the wear of the brake lining. The purposed of the wear detector 27 is to notify the operator that the amount of wear of the brake lining has reached a predetermined level.

The wear detector 27 is constituted of a switch operating member 28 movable with the movement of the power piston 18 and an electric switch 29 to be operated when it is lowered by the movement of the operating member 28.

The principle of operation of the wear detector 27 is as follows: When the amount of wear of the brake lining is zero, the power piston 18 is stroked or moves for a distance l and, at the end of the stroke shown by a line A, a braking effect occurs. With increase of the wear amount of the brake lining, the stroke of the power piston 18 needed to actuate a braking effect will be increased. For example, the brake may be actuated only when the power piston 18 is stroked for a distance $l_1$ and reaches a line B. The difference $l_d$ between the strokes l and $l_1$ corresponds to the wear amount of the brake lining. Therefore, by positioning the top of the switch operating member 28 at the distance $l_d$ corresponding to a predetermined wear amount, the power piston 18 may push the switch operating member 28 in the direction $T_1$ when the wear amount of the brake lining exceeds a predetermined level to close an electric switch 29 engageable by a recess 30 formed in the member 28, so that the operator becomes aware that the wear amount of the brake lining exceeds the predetermined level.

On the other hand, even when the wear amount of the brake lining is the same, in the case of mild braking, the stroke of the power piston 18 may be shorter than that in the case of abrupt braking. As shown in FIG. 3, when the wear amount of the brake lining is zero, the power piston 18 may be moved by a distance l with a mild braking and for a distance $l_2$ with abrupt braking. With a predetermined wear amount of the lining being reached, the power piston 18 may be stroked for a distance $l_1$ with mild braking and for a distance $l_3$ with abrupt braking. FIG. 4 is a graph showing the above conditions. In FIG. 4, the ordinate shows the stroke of the power piston 18 and the abscissa shows the operating pressure of the power piston, i.e., braking force. The difference in stroke between mild and abrupt brakings means the ultimate difference in power piston operating pressure therebetween and, thus, the more abruptly the braking operation is applied, the larger will be the power piston operating pressure. In proportion to the power piston operating pressure, the braking fluid pressure of the wheel cylinder will be increased. Accordingly, as the transformation of the brake shoe and brake drum becomes large, the stroke of the power piston will be increased to that extent. Namely the relation between the power piston operating pressure and the power piston stroke with the wear amount of the lining being zero is shown by a line C and that with the wear amount of the lining being a predetermined level is indicated by a line D.

In order to provide an accurate wear detecter for the brake lining, it should be constructed so that the switch 29 can be actuated in a hatched area E above the line D. On the other hand, since the conventional wear detector is constructed so that the switch 29 is actuated at a constant stroke of the power piston, the conventional wear detector has no mechanism for making the stroke amount variable when the switch 29 is actuated. Therefore, for example, when the constant amount of the stroke at which the switch 29 is actuated is set at F, the switch 29 may not be actuated in a hatched zone G defined by an area below the line F and above the line D where the wear reaches the predetermined level while the switch 29 may be actuated in a zone H defined by an area above the line F and below the line D where the wear is still below the predetermined level.

In the conventional lining wear detector, the stroke of the power piston, when the switch 29 is actuated, is set on a line I, i.e., at a level of value determined by the predetermined wear and the maximum power piston operating pressure (maximum abrupt braking). With this setting of the stroke of the power piston, it is possible to overcome the disadvantage that the switch 29 may be actuated before the wear reaches the predetermined level as in zone H. However, there is still a disadvantage that, in a zone J defined by an area below the line I and above the line D, the switch 29 may not be actuated regardless of whether or not the wear has reached the predetermined level. Moreover, when the braking operation is allowed to continue within the range of low operating pressure of the power piston, there occurs the possibility that the lining will be worn out to exceed a predetermined extent by a maximum wear amount corresponding to the stroke L.

When the maximum abrupt brake (using the maximum power piston operating pressure) is applied with the lining being thus excessively worn, the piston stroke may increase along a line M up to a point N. That is, if the detector is so constructed that, when the wear of the lining reaches the predetermined level, the switch 29 is actuated regardless of the power piston operating pressure, the range of the stroke of the power piston is up to a point O. However, in the conventional detector, there is a possibility that the stroke range is up to the point N. Therefore, it is necessary to provide an allowance stroke L corresponding to the distance between the points O and N as shown in FIG. 3, which will necessitate the detector to be bulky in structure.

In summary, the conventional lining wear detector is constructed such that the switch is actuated when the power piston reaches a single predetermined position. Therefore, it is impossible to exactly detect that the wear of the lining has reached a predetermined level. Further, owing to this disadvantage it is necessary to provide an allowance stroke for the power piston, causing the booster to be bulky.

SUMMARY OF THE INVENTION

An object of the present invention is to provide a brake booster provided with a brake lining wear detector which can exactly detect that the wear of the brake lining has reached a predetermined level (e.g. a limit wear amount) regardless of the power piston operating pressure, i.e., regardless of the intensity of brake application.

Another object of the present invention is to provide a brake booster which can exactly detect that the wear of the brake lining reaches the predetermined level and by which the safety and credibility of the brake is improved.

A further object of the present invention is to provide a brake booster which is which can exactly detect that the wear of the brake lining has reached the predetermined level and by which it is possible to reduce the size and weight of the product and to reduce the manufacturing costs thereof.

According to the present invention, the above objects are achieved by providing, in the brake booster, a wear detector comprising a switch operating member which has a spring at one end and which is moved by a pushing force provided by a power piston of a power cylinder of the booster, a switch to be operated by the operating member and means for applying a pressure corresponding to a power piston operating pressure to the other end of the operating member to move the same through the spring, due to the movement of the power piston.

BRIEF DESCRIPTION OF THE DRAWINGS

FIG. 5 is a partially cross-sectional side view of an embodiment of the present brake booster;

DETAILED DESCRIPTION OF THE INVENTION

Preferred embodiments of the present invention will now be described with reference to FIGS. 5, 6a and 6b.

Figure 1:
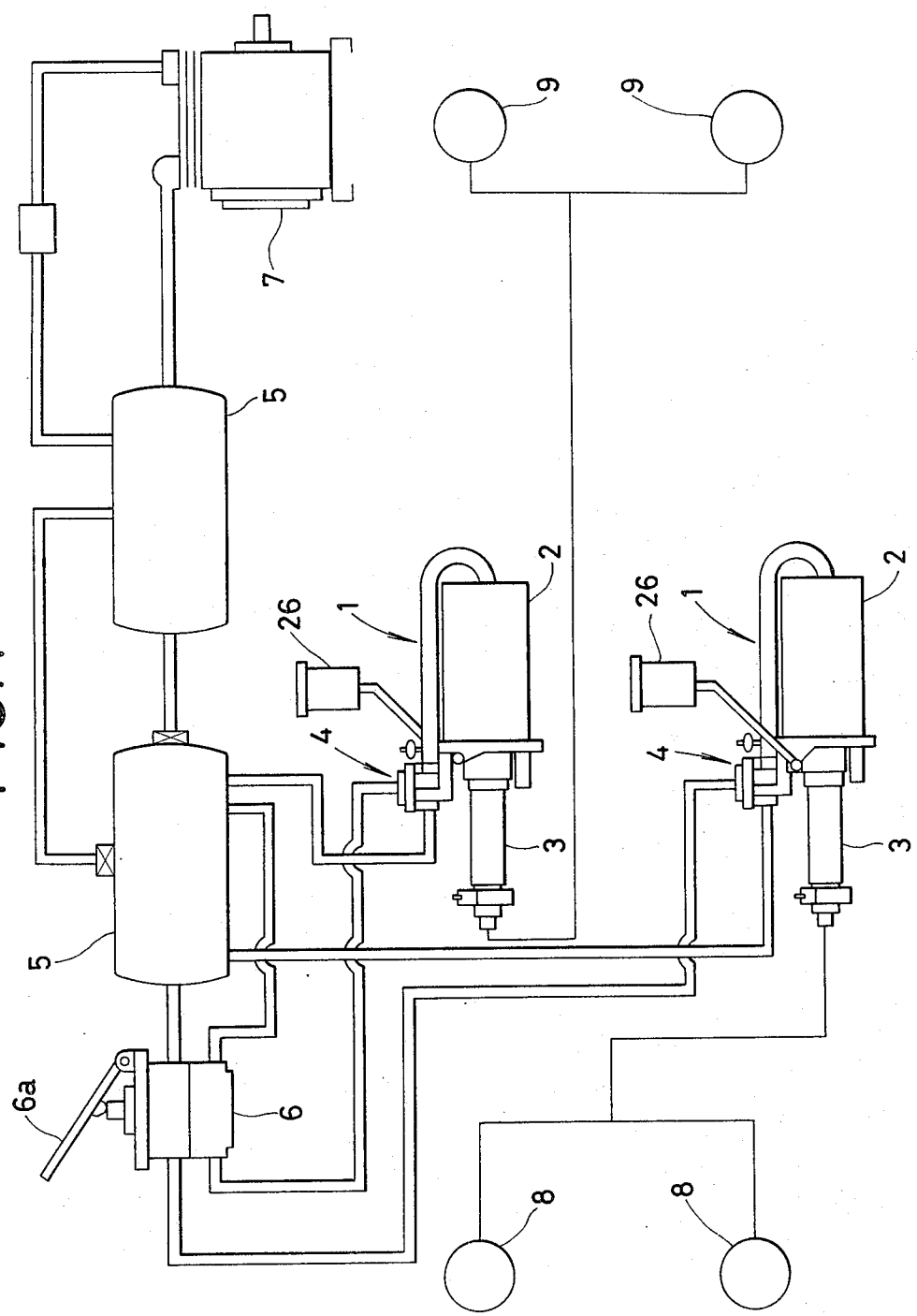
FIG. 1 is a schematic circuit diagram including a brake booster.
Figure 2:
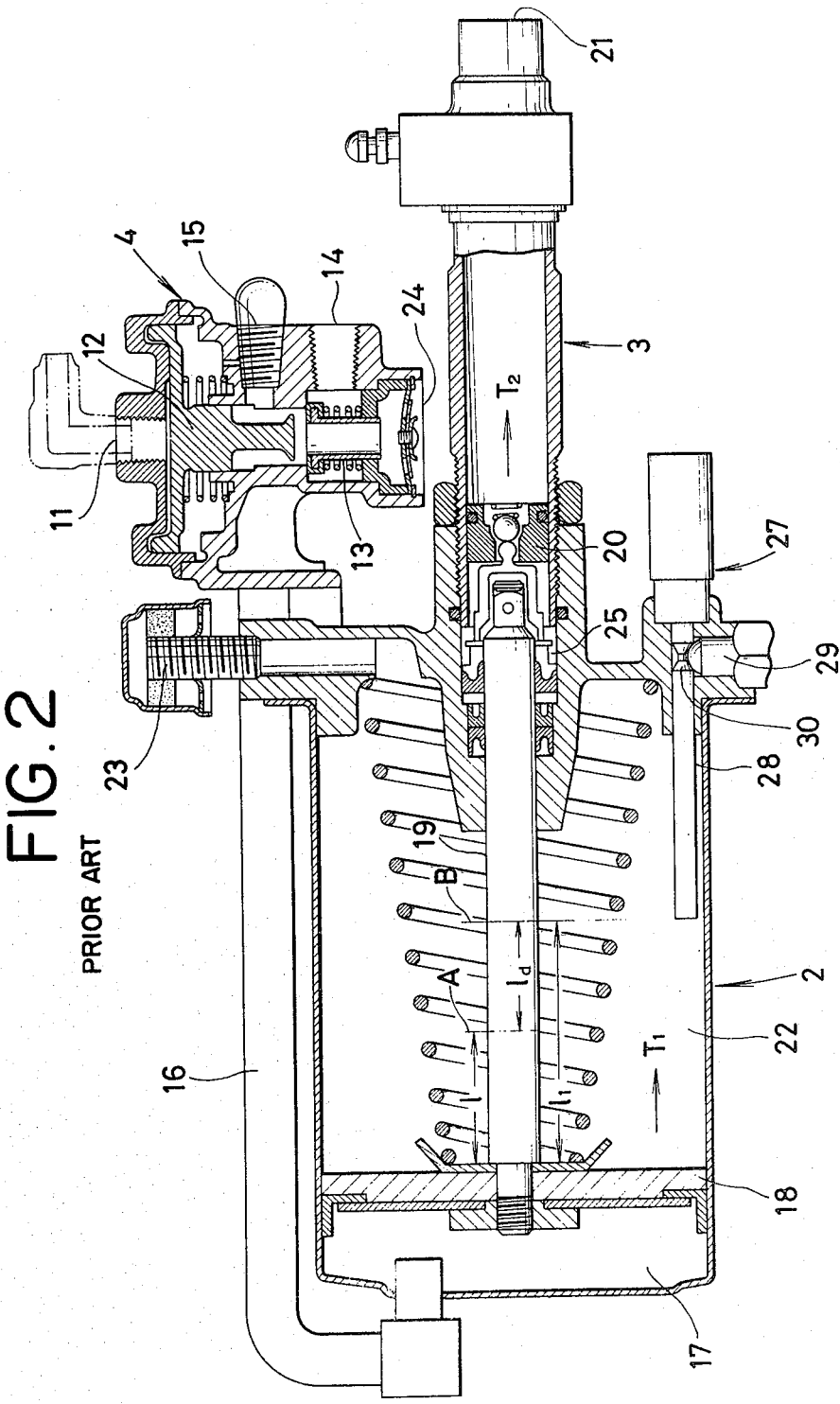
FIG. 2 is a partially cross-sectional side view of a conventional brake booster.
Figure 3:
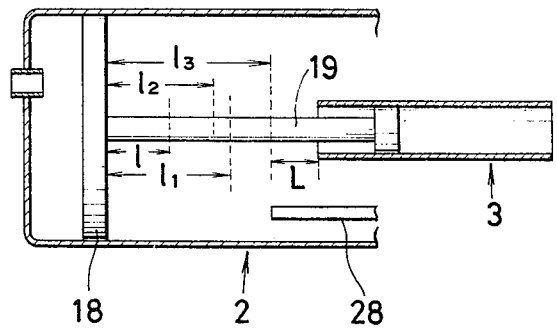
FIG. 3 is a schematic illustration of a power cylinder according to the present invention, explaining the strokes of a power piston associated therewith.
Figure 6B:
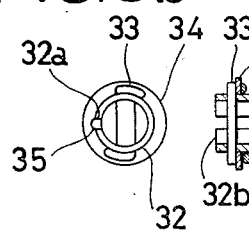
FIG. 6b is a left side view of the same.
Figure 6A:
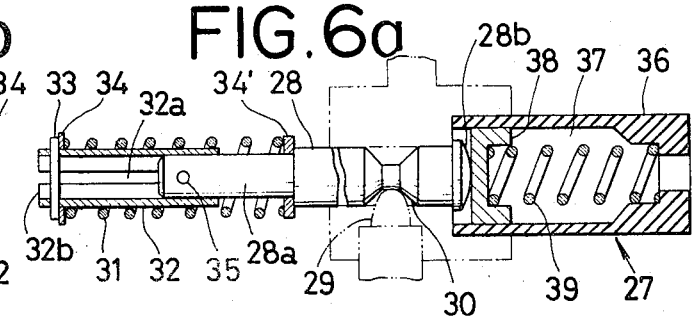
FIG. 6a is an enlarged cross-section of the main portion of the brake lining wear detector in FIG. 5.

The booster shown in FIGS. 5, 6a and 6b is of the same air over hydraulic type as that shown in FIG. 2. Since the structural features of the brake booster are the same as those shown in FIG. 2, the details thereof will not be explained. Therefore, only the wear detector for the brake lining which constitutes the present invention will be described.

The wear detector according to the present invention comprises a switch operating member 28 which is pushed by the power piston 18 to move and a switch 29 to be actuated by the movement of the operating member 28. The operating member 28 is movable in the same direction as that of the movement of the power piston 18. The operating member 28 is formed with a recess 30 with which the electric switch 29 is always engaged. When the operating member 28 is moved, the switch 29 is pushed out from the recess 30 and down by the operating member 28 to thereby turn the switch on. One end of the operating member 28 confronting the power piston 18 is equipped with a spring 31 through which the operating member 28 is pushed by the power piston 18. The diameter of one end of the operating member 28 is reduced to form a reduced diameter portion 28a which is inserted into a cylindrical member 32 having a longitudinal slit 32a. An S-shaped spring stopper 33 is provided on the cylindrical member 32 to support a spring seat 34 and a spring 31 is mounted between the spring seat 34 and a spring seat 34' mounted on the operating member 28. It is possible to use resilient members other than the spring 31 for this purpose. A pin 35 is inserted into a hole of the operating member 28, which engages with the slit 32a of the cylindrical member 32 to provide a guide.

The other end 28b of the operating member 28 has a shape suitable for receiving a pressure corresponding to the operating pressure of the power piston 18, i.e., a pressure equal to or proportional to the operating pressure. The cylindrical member 36 forms a pressure chamber 37 with which the other end 28b of the operating member 28 is faced. A slide member 38 is provided in the pressure chamber 37 to receive a pressure and the pressure chamber 37 is in communication with an outlet port 15 of a relay valve 4. Therefore, a pressure at the outlet port 15 which corresponds to the operating pressure of the power piston 18 is transmitted through the slide member 38 to the other end 28b of the operating member 28.

A return spring 39 is provided to return the slide member 38 and the operating member 28 to the left with a slight force. Since a pressure to be applied to the pressure chamber 37 corresponds to the operating pressure of the power piston 18, it may be possible to communicate the pressure chamber 37 with an air pressure chamber 17 of the power cylinder or it may be possible to provide separate means for producing a pressure corresponding to the operating pressure of the power piston to obtain the same effect.

The wear detector according to the present invention is constructed as described hereinbefore. Therefore, assuming a state where the wear of the brake lining is just below the predetermined level, the power piston 18 is stroked until a line P with mild braking (the operating pressure of the power piston is small) as shown in FIG. 5 to move the top end 32b of the cylindrical member 32 of the detecter towards the line P. In this case, however, the contraction amount of the spring 31 is small and thus the pressing force exerted on the operating member 28 due to the spring 31 is also small. By determining the area of the slide member 38 and the pressure in the pressure chamber 37 in such a way that the pressing force exerted on the operating member 28 is substantially the same as the pressing force of the spring 31 and is in the opposite direction, the operating member 28 does not move and thus the switch 29 is not actuated. On the other hand, with abrupt braking (the operating pressure of the power piston is large), the power piston is stroked until a line Q and the contraction amount of the spring 31 becomes larger correspondingly than that with mild braking. Therefore the pressing force of the spring 31 becomes larger. In this case, however, since the pressure in the pressure chamber 37 (pressure corresponding to the operating pressure of the power piston) becomes larger, the pressing force exerted on the operating member 28 to press it in the opposite direction becomes larger correspondingly to balance the two forces. Therefore, the operating member does not move and thus the switch 29 is not actuated.

Figure 4:
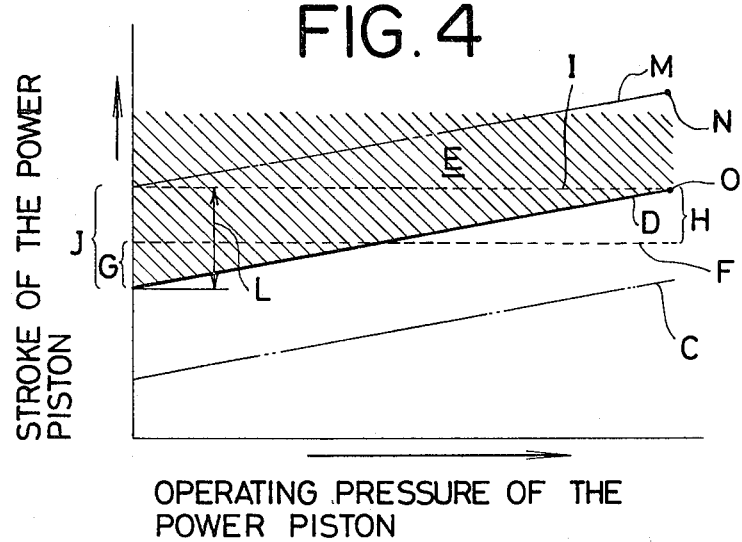
FIG. 4 is a graph showing the relationship between the power piston operating pressure and the strokes of the power piston.

That is, if the wear of the lining is considered as constant, the pressing force of the spring 31 corresponds to the contraction of the spring 31, the contraction of the spring 31 corresponds to the stroke of the power piston and the latter corresponds to the operating pressure of the power piston, as shown in FIG. 4. Therefore, the pressing force of the spring 31 corresponds to the operating pressure of the power piston. On the other hand, a pressure corresponding to the operating pressure of the power piston is applied to the other end 28b of the switch operating member 28, as mentioned previously. The two pressing forces exerted on the switch operating member 28 correspond to the operating pressure of the power piston. Therefore, by determining the area of the slide member 38 in such a way that when the wear is slightly below the predetermined level the force exerted on the end 28b of the switch operating member 28 becomes equal to the pressing force of the spring 31, the two pressing forces exerted on the switch operating member 28 are balanced, causing no movement of the member 28 regardless of the operating pressure of the power piston, provided that the wear of the lining is slightly below the predetermined level.

On the other hand, when the wear of the brake lining increases and reaches the predetermined level, the power piston with mild braking is stroked until a line R, the contraction of the spring 31 increases slightly comparing with that in the case of just below the predetermined level and the pressing force of the spring 31 increases slightly correspondingly. Since, the pressure in the pressure chamber 37 with mild braking is constant regardless of whether the wear is just below or equal to the predetermined level, the pressing force exerted on the operating member 28 to urge it in the opposite direction does not change. Therefore, due to the increase of the pressing force of the spring 31, the two pressing forces exerted on the operating member 28 become unbalanced, causing the latter to move to the right and the switch 29 to be actuated. Similarly, with abrupt braking, the power piston 18 is stroked until a line S and the pressing force of the spring 31 increases slightly comparing with the case where the wear is just below the predetermined level. However, since the pressing force in the opposite direction is the same as that when the wear is just below the predetermined level, the balance of the two pressing forces is broken due to the increase of the pressing force of the spring 31, causing the operating member 28 to move and the switch 29 to be actuated.

By constituting it in such a manner that the operating member 28 is pushed by the power piston 18 through the spring 31 provided on one end of the operating member 28 as mentioned, previously, and the pressure corresponding to the operating pressure of the power piston 18 is applied to the other end 28b of the operating member 28, the stroke of the power piston 18, when the switch 29 is actuated in response to a change of the operating pressure of the power piston 18, is changed so that when the wear of the lining reaches the predetermined level, the switch 29 is actuated regardless of the operating pressure of the power piston (regardless of whether mild or abrupt braking is applied) and the switch 29 is not actuated just before the wear reaches the predetermined level regardless of the operating pressure of the power piston. Since, in this manner, the wear of the lining after reaching the predetermined level is exactly detected, there is no need of providing an allowance stroke range for the power piston, which provision is otherwise necessary and thus it is possible to reduce the size, weight and manufacturing cost of the brake booster.

The brake booster to which the present invention is applicable is of the type composed by combining the power cylinder and the hydraulic cylinder. Although, in this specification, the power cylinder of the compressed air type is disclosed, other power cylinders may be used similarly. For example, the power cylinder of vacuum type may be used.

The brake booster according to the present invention is not limited to the shown embodiment and it should be recognized that any modifications of which are apparent for these skilled in the art will fall in the scope of the present invention.

What is claimed is:

1. In a brake booster having a power cylinder which receives pressure fluid and a hydraulic cylinder actuable by the power cylinder when it receives pressure fluid, in combination and having a wear detector for detecting the wear of a brake lining when it has reached a predetermined level, the wear detector comprising:
   a switch operating member (28) so arranged as to be moved by means of a power piston (18) disposed in the power cylinder and provided with a spring (31) at one end;
   a switch (29) adapted to be actuated due to the movement of said switch operating member; and
   means for exerting a pressure corresponding to the operating pressure of the power piston onto an other end (28b) of said switch operating member;
   said switch operating member (28) being so constituted as to be pressed and moved by the power piston through said spring (31);
   said pressure exerting means having a pressure chamber (37) arranged to face said other end of said switch operating member, a pressure-receiving and sliding member (38) disposed in said pressure chamber and provided at said other end of said switch operating member, and means for connecting said pressure chamber to a portion of the power piston exposed to pressure fluid, the area of said pressure-receiving and sliding member being such that when the wear of a brake lining remains slightly less than the predetermined level, power from said pressure exerting means acting on said other end (28b) of said switch operating member (28) becomes equal to the pressing power of said spring (31).

2. A brake booster with brake lining wear detector combination comprising:
   a power cylinder having a power piston slidable therein and movable by a pressure fluid to a position in said power piston which depends on the pressure of the pressure fluid and a state of wear of a brake lining;
   a hydraulic cylinder/piston unit connected to said power cylinder, actuated by movement of said power piston;
   a switch operating member movably mounted to said power cylinder;
   a detector switch connected to said power cylinder and actuated by movement of said switch operating member;
   a spring member connected to one end of said switch operating member, engageable by said power piston to transmit a pushing force to said switch operating member;
   a detector cylinder connected to said power cylinder having a cylinder space;
   a detector piston slidable in said cylinder space connected to an opposite end of said switch operating member;
   said cylinder space connected to a portion of said power cylinder exposed to pressure fluid for exerting a pressure, proportional to a pressure of the pressure fluid, on said detector piston; and
   an area of said detector piston exposed to the pressure fluid and a biasing force exerted by said spring member being selected to apply opposite forces to said switch operating member, the opposite forces being insufficient to move said switch operating member to activate said detector switch at all times before a level of wear of the brake lining is less than a predetermined amount, the biasing force of said spring member exceeding the force applied by the pressure fluid on said area of said detector piston when the predetermined amount of wear of brake lining has been reached and exceeded to move said switch operating member and activate said detector switch.

3. The combination of claim 2, wherein said switch operating member has a reduced diameter portion extending at said one end thereof, a sleeve slidably mounted on said small diameter portion, said spring member comprising a compression spring wrapped on said small diameter portion and sleeve for biasing said sleeve outwardly of said small diameter portion, said sleeve engageable by said power piston.

4. The combination of claim 2, wherein said switch operating member has a pressure surface at the opposite end thereof engaged with said detector piston, and biasing means in said detector cylinder biasing said detector piston against said pressure surface by a force substantially less than the biasing force of said spring member.

* * * * *

UNITED STATES PATENT AND TRADEMARK OFFICE
CERTIFICATE OF CORRECTION

PATENT NO. : 4,316,529
DATED : February 23, 1982
INVENTOR(S) : Ichiro Yanagawa, et al It is certified that error appears in the above-identified patent and that said Letters Patent is hereby corrected as shown below:

On the Title page Item [73] Assignee add:

-- JIDOSHA KIKI CO., LTD.--.

Signed and Sealed this

Tenth Day of August 1982

[SEAL]

Attest:

Attesting Officer

GERALD J. MOSSINGHOFF
Commissioner of Patents and Trademarks